(12) United States Patent
Yamada et al.

(10) Patent No.: US 12,013,347 B2
(45) Date of Patent: Jun. 18, 2024

(54) PRODUCT INSPECTION METHOD AND PRODUCT INSPECTION APPARATUS

(71) Applicants: Ushio Denki Kabushiki Kaisha, Tokyo (JP); TOWA PHARMACEUTICAL CO., LTD., Kadoma (JP)

(72) Inventors: Go Yamada, Tokyo (JP); Aya Ota, Tokyo (JP); Koji Nakayama, Osaka (JP)

(73) Assignees: USHIO DENKI KABUSHIKI KAISHA, Tokyo (JP); TOWA PHARMACEUTICAL CO., LTD., Kadoma (JP)

(*) Notice: Subject to any disclaimer, the term of this patent is extended or adjusted under 35 U.S.C. 154(b) by 163 days.

(21) Appl. No.: 17/598,401

(22) PCT Filed: Mar. 25, 2020

(86) PCT No.: PCT/JP2020/013499
§ 371 (c)(1),
(2) Date: Sep. 27, 2021

(87) PCT Pub. No.: WO2020/196690
PCT Pub. Date: Oct. 1, 2020

(65) Prior Publication Data
US 2022/0178848 A1    Jun. 9, 2022

(30) Foreign Application Priority Data
Mar. 27, 2019  (JP) ................................. 2019-061998

(51) Int. Cl.
*G01N 21/95*    (2006.01)
*G01N 21/88*    (2006.01)
*G01N 21/956*   (2006.01)

(52) U.S. Cl.
CPC . *G01N 21/9508* (2013.01); *G01N 2021/8845* (2013.01); *G01N 2021/95615* (2013.01)

(58) Field of Classification Search
CPC ............. G01N 21/9508; G01N 21/255; G01N 2021/396; G01N 2021/8845; G01J 3/42;
(Continued)

(56) References Cited

U.S. PATENT DOCUMENTS

| 5,521,696 A * | 5/1996 | Dunne ..................... G01S 17/86 256/28 |
| 11,268,855 B2 * | 3/2022 | Nagashima ........... G01J 3/0218 |

(Continued)

FOREIGN PATENT DOCUMENTS

| CN | 101371130 A | 2/2009 |
| CN | 109196416 A | 1/2019 |

(Continued)

OTHER PUBLICATIONS

Nishizawa "Wavelength Variable Pulse Light Generator, and Optical Tomographic Measuring Instrument Using the Same", Jan. 10, 2008, JP 2008002815A (Year: 2008).*

(Continued)

*Primary Examiner* — Sang H Nguyen
(74) *Attorney, Agent, or Firm* — BUCHANAN INGERSOLL & ROONEY PC

(57) ABSTRACT

Super continuum light having a continuous spectrum over at least 1100 to 1300 nm is emitted from a pulsed light source, is pulse-stretched by a stretching element such that a relationship between a wavelength and an elapsed time in one pulse is one to one, and is radiated to a product. The light transmitted through the product is received by a light receiver, and output data is input to the determination unit. A quality determination program of the determination unit calculates an absorption spectrum from the output data, (Continued)

quantifies the absorption spectrum by chemometrics, and compares the absorption spectrum with a reference value to determine quality. The product determined to be a defective product is excluded by an exclusion mechanism.

19 Claims, 10 Drawing Sheets

(58) Field of Classification Search
CPC ... G01J 11/00; G11C 7/02; G11C 7/06; G11C 13/0004; G11C 13/0026; G11C 13/0028; G11C 13/004; G11C 2013/0042; G11C 2013/0054; C11C 13/0069
See application file for complete search history.

(56) References Cited

U.S. PATENT DOCUMENTS

| | | | |
|---|---|---|---|
| 2001/0051031 A1* | 12/2001 | Hada | G02B 6/29376 398/147 |
| 2004/0146295 A1* | 7/2004 | Furman | G01N 21/95607 398/9 |
| 2009/0323735 A1* | 12/2009 | Kuksenkov | H01S 3/067 385/124 |
| 2010/0046560 A1* | 2/2010 | Liu | H01S 3/06754 372/9 |
| 2010/0118900 A1* | 5/2010 | Waarts | H01S 3/0057 372/25 |
| 2014/0233091 A1* | 8/2014 | Clowes | H01S 3/06754 359/341.1 |
| 2015/0355083 A1 | 12/2015 | Marbach | |
| 2018/0296097 A1 | 10/2018 | Islam | |
| 2019/0129278 A1 | 5/2019 | Ichihara et al. | |
| 2020/0166406 A1* | 5/2020 | Ota | G01N 21/31 |
| 2022/0268629 A1 | 8/2022 | Ota et al. | |

FOREIGN PATENT DOCUMENTS

| | | |
|---|---|---|
| DE | 112017001881 T5 | 12/2018 |
| EP | 2042855 A1 | 4/2009 |
| JP | H0634622 A | 2/1994 |
| JP | 2001272339 A | 10/2001 |
| JP | 2002039940 A | 2/2002 |
| JP | 2008002815 A | 1/2008 |
| JP | 2011191129 A | 9/2011 |
| JP | 2012098181 A | 5/2012 |
| JP | 2013205390 A | 10/2013 |
| JP | 2015535084 A | 12/2015 |
| WO | 2008001785 A1 | 1/2008 |
| WO | 2018225799 A1 | 12/2018 |
| WO | 2018230506 A1 | 12/2018 |

OTHER PUBLICATIONS

Tanaka "Light Wave Distance Measuring Apparatus", Nov. 26, 1999, JP H11326515 A (Year: 1999).*
"Near-Infrared Spectroscopy", written and edited by Yukihiro Ozaki, published by Kodansha Ltd., pp. 59 to 75 (with English translation—30 total pages).
International Search Report (PCT/ISA/210) and Written Opinion (PCT/ISA/237) with translations dated Jun. 16, 2020, by the Japan Patent Office as the International Searching Authority for International Application No. PCT/JP2020/013499.
Office Action (Decision of Refusal) dated Oct. 11, 2022, in corresponding Japanese Patent Application No. 2019-061998 and English translation of the Office Action. (6 pages).
Extended European Search Report dated Nov. 14, 2022, issued in corresponding European Application No. 20777970.3. (9 pages).
Song et al., "Ultra-High-Speed Phase-Sensitive Optical Coherence Reflectometer With a Stretched Pulse Supercontinuum Source", Applied Optics, Optical Society of America, Washington, DC, US, Jul. 20, 2011, vol. 50, No. 21, pp. 4000-4004, XP001564269.
First Notice of Reasons for Refusal, issued in Chinese Application 202080019264.5, Mailed on Sep. 6, 2023, 18 pages (including English Translation).
Notice of Reasons for Refusal, issued in Japanese Application No. 2023-001755, Mailed on Aug. 22, 2023, 11 Pages (including English Translation).
Tarumi , "An Introduction to Near-Infrared Spectroscopy for Pharmaceutical Analysis", Pharmaceuticals, vol. 77, No. 2, 2017, pp. 81-85.

* cited by examiner

FIG. 2 (1)
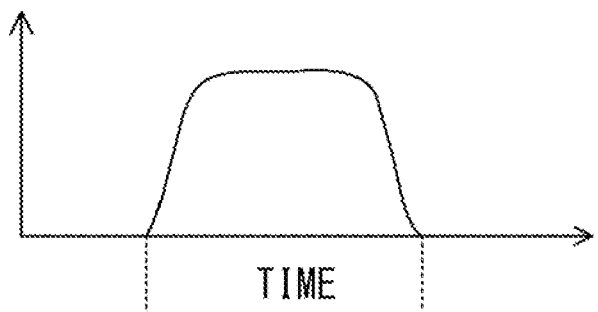
FIG. 2 (2)
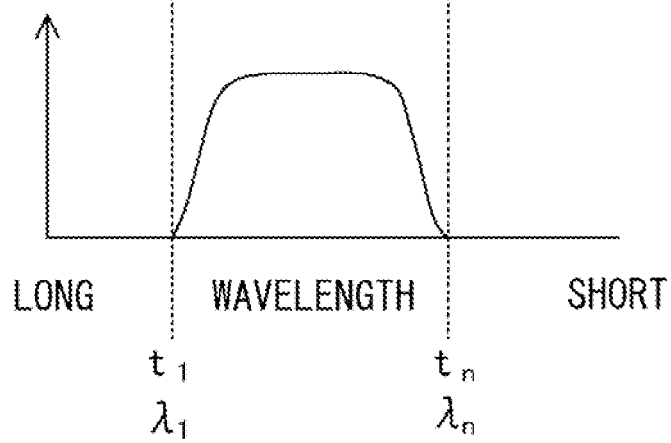
FIG. 2(3)
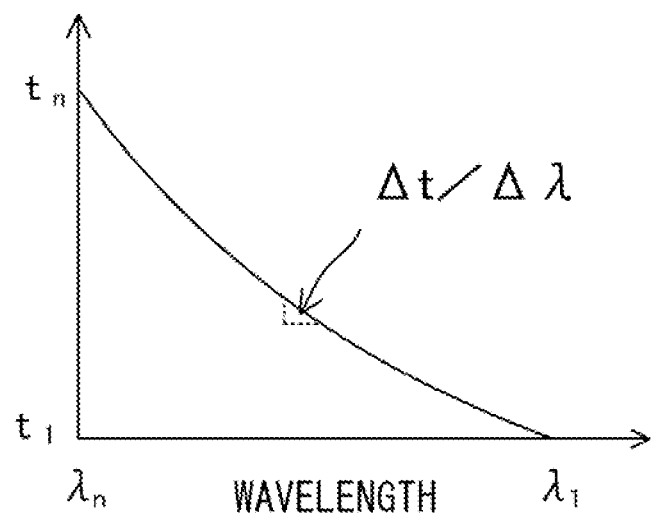

FIG. 5

| INTRA-PULSE TIME | WAVELENGTH | REFERENCE SPECTRUM DATA | MEASUREMENT VALUE | ABSORPTION SPECTRUM |
|---|---|---|---|---|
| $t_1$ | $\lambda_1$ | $V_1$ | $v_1$ | $v_1/V_1$ |
| $t_2$ | $\lambda_2$ | $V_2$ | $v_2$ | $v_2/V_2$ |
| $t_3$ | $\lambda_3$ | $V_3$ | $v_3$ | $v_3/V_3$ |
| ⋮ | ⋮ | ⋮ | ⋮ | ⋮ |
| $t_{n-2}$ | $\lambda_{n-2}$ | $V_{n-2}$ | $v_{n-2}$ | $v_{n-2}/V_{n-2}$ |
| $t_{n-1}$ | $\lambda_{n-1}$ | $V_{n-1}$ | $v_{n-1}$ | $v_{n-1}/V_{n-1}$ |
| $t_n$ | $\lambda_n$ | $V_n$ | $v_n$ | $v_n/V_n$ |

FIG. 7 (1)
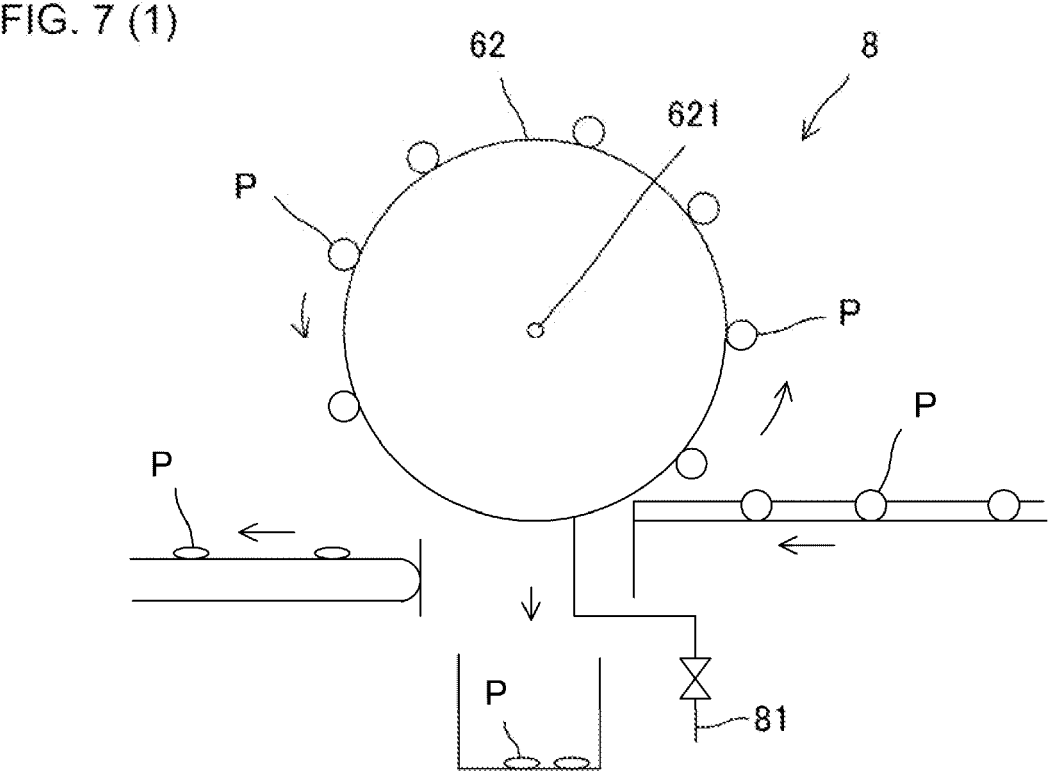
FIG. 7 (2)
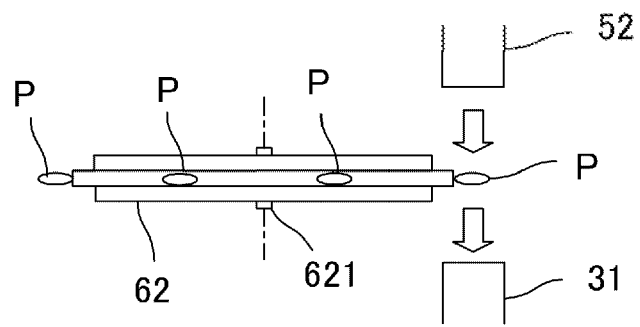

FIG. 9 (1)
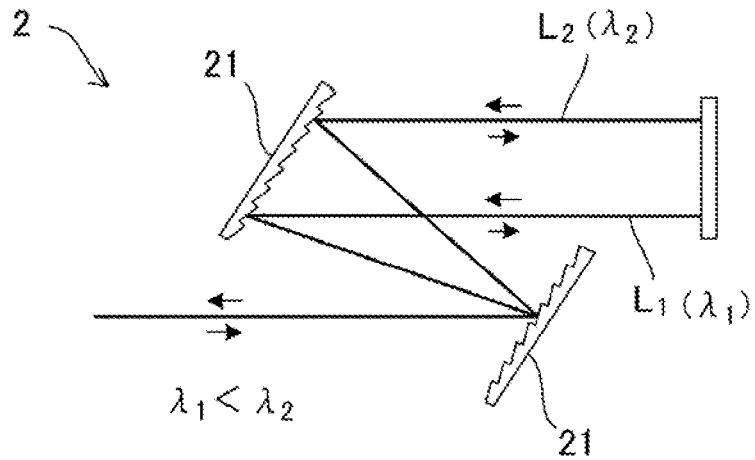
FIG. 9 (2)
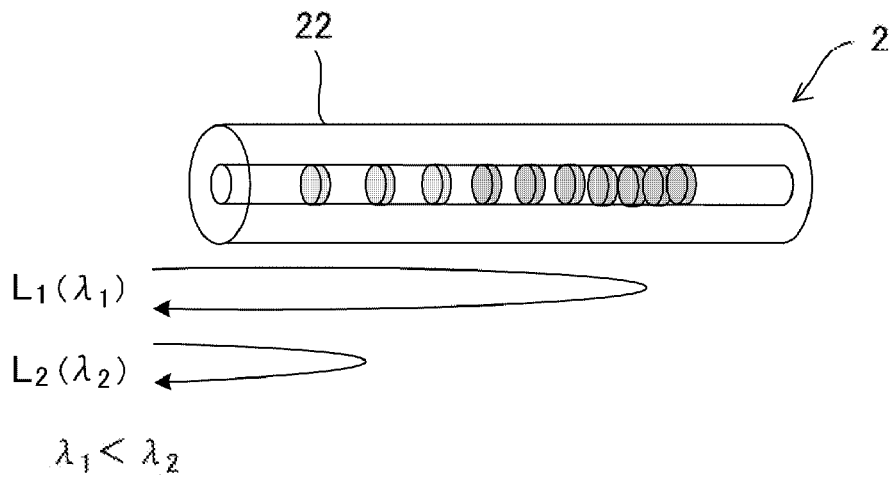
FIG. 9 (3)
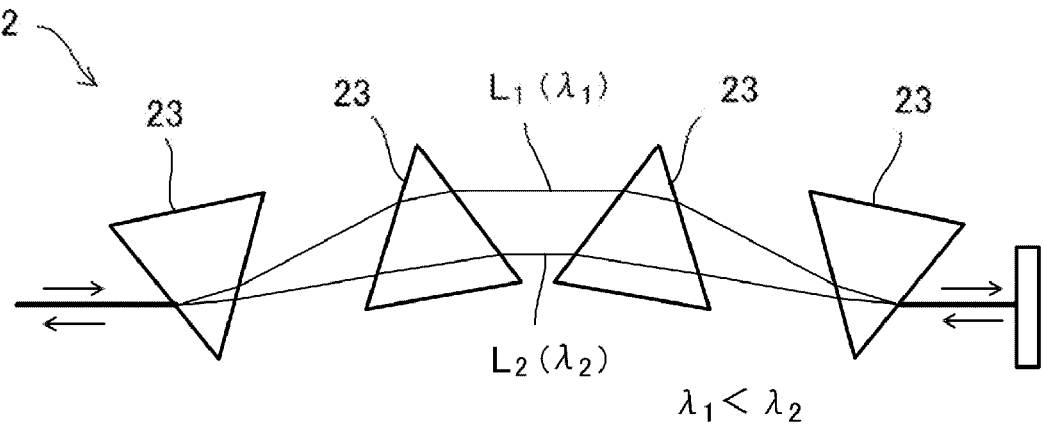

PRODUCT INSPECTION METHOD AND PRODUCT INSPECTION APPARATUS

BACKGROUND

1. Technical Field

The invention of this application relates to a technique of product inspection in which quality of various products is determined by light measurement.

2. Description of the Related Art

A technique of spectroscopic analysis in which an object is irradiated with light and transmitted light, reflected light, or the like from the object is dispersed by a spectroscope to measure a spectrum is one of typical methods of material analysis. This method is also applied to quality determination of a product.

Typically, as in high-performance liquid chromatography (HPLC), a part of a product is extracted and dissolved in a solution as necessary, and its absorption spectrum or the like is measured to determine quality of the product. An absorption spectrum or the like in the case of a non-defective product is checked in advance, and the quality of the product is determined by comparison with the absorption spectrum or the like.

CITATION LIST

Patent Literature

[Patent Literature 1] JP H06-034622 A

Non Patent Literature

[Non Patent Literature 1] "Near-Infrared Spectroscopy", written and edited by Yukihiro Ozaki, published by Kodansha Ltd., pages 59 to 75

Optical characteristics such as an absorption spectrum and a reflection spectrum faithfully reflect the contained components and the amount thereof, and it is possible to identify and quantify the components with high accuracy. Therefore, quality determination can be performed with high reliability even in product inspection.

However, conventional techniques such as HPLC have a disadvantage that measurement and preparation thereof are very time-consuming. For this reason, it is only used when only a part of the product is periodically extracted, and the quality is checked. For products that require particularly high reliability, such as pharmaceutical products, total inspection is often desirable, but performing total inspection by light measurement is unrealistic in conventional techniques.

It is conceivable that each finished product is not partially dissolved in a solution, but is irradiated with light as it is, and transmitted light through the product is measured to obtain an absorption spectrum, thereby determining quality. However, in conventional spectroscopic measurement using a diffraction grating, it is necessary to change a posture of the diffraction grating according to a wavelength region to be measured (wavelength sweep), and it is considered that high-speed measurement assuming total inspection cannot be realized.

In addition, in the case of a product having high absorption (transmittance of less than about 1%), the transmitted light is weak, and thus it is expected that a problem in measurement accuracy will occur. In the spectroscopic measurement using the diffraction grating, in order to sufficiently increase an SN ratio of the measurement or perform the measurement with high sensitivity, it is necessary to slow down the sweep or perform the sweep several times to increase the total amount (light amount) of light incident on a light receiver. This point is one of the factors that make the high-speed measurement difficult, but this problem becomes significant when light to be measured is weak. That is, when priority is given to the high speed, the inspection accuracy is remarkably lowered due to the influence of the SN ratio.

If a multichannel spectroscopic measurement apparatus using an area sensor in which a large number of photoelectric conversion elements are arranged in a line is used, sweeping of the diffraction grating is unnecessary. However, it is necessary to increase the amount of light for analysis with a high SN ratio and high sensitivity, and the problem that high-speed analysis cannot be performed is not solved.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

The present disclosure has been made to solve such problems of the related art.

A product inspection method according to the present disclosure is a product inspection method for determining quality of a product by performing light measurement, the method including:

an emission step of causing broadband pulsed light to be emitted from a light source;

a stretching step of stretching a pulse width of the emitted pulsed light by a stretching element such that a wavelength and an elapsed time in one pulse have a one-to-one relationship in one pulse;

an irradiation step of irradiating a product with the stretched pulsed light;

a light receiving step of receiving, by a light receiver, light from the product irradiated with the stretched pulsed light; and a determination step of determining quality of the product by processing output data from the light receiver.

In one embodiment, the determination step may be a step of determining the quality of the product by calculating a content ratio or a content of a specific component of the product according to the output data and comparing the calculated content ratio or content with a reference value.

In one embodiment, the determination step may be a step of determining the quality based on a value at a predetermined time in one pulse of the output data from the light receiver by comparison with a reference value without calculating an optical characteristic.

In one embodiment, the determination step may be a step of determining the quality without performing quantitative determination by comparing an optical characteristic of a predetermined wavelength calculated based on a value at a predetermined time in one pulse of the output data from the light receiver or a value at the predetermined time with a reference value.

In one embodiment, the broadband pulsed light emitted in the emission step may be light having a continuous spectrum covering at least a wavelength region of 1100 to 1200 nm.

In one embodiment, the broadband pulsed light emitted in the emission step may be light having a continuous spectrum covering at least a wavelength region of 1000 to 1300 nm.

In one embodiment, the pulsed light pulse-stretched in the stretching step may have a slope of a change in time with respect to a wavelength of 10 picoseconds or more per 1 nm.

In one embodiment, the light receiving step may be a step of receiving light transmitted through the product.

In one embodiment, the irradiation step may be a step of radiating the pulsed light in a pattern having a size equal to or larger than a size of a pattern of the product from one side.

In one embodiment a product inspection apparatus according to the present disclosure is a product inspection apparatus structured to determine quality of a product by performing light measurement, the product inspection apparatus comprising:

a pulsed light source structured to emit broadband pulsed light;

a stretching element structured to stretch a pulse width of the pulsed light emitted from the pulsed light source such that a wavelength and an elapsed time have a one-to-one relationship in one pulse;

a light receiver provided at a position where light from a product irradiated with the stretched pulsed light is received; and a determination unit structured to determine quality of the product by processing output data from the light receiver.

In addition, in order to solve the above problems, in the product inspection apparatus, the determination unit may be a unit structured to determine the quality of the product by calculating a content ratio or a content of a specific component of the product according to the output data from the light receiver and compare the calculated content ratio or content with a reference value.

In one embodiment, the determination unit may be a unit structured to determine the quality based on a value at a predetermined time in one pulse of the output data from the light receiver by comparison with a reference value without calculating an optical characteristic.

In one embodiment, the determination unit may be a unit structured to determine the quality without performing quantitative determination by comparing an optical characteristic of a predetermined wavelength calculated based on a value at a predetermined time in one pulse of the output data from the light receiver or a value at the predetermined time with a reference value.

In one embodiment, the pulsed light source may be a light source structured to emit pulsed light that is light having a continuous spectrum covering at least a wavelength region of 1100 to 1200 nm.

In one embodiment, the pulsed light source may be a light source structured to emit pulsed light that is light having a continuous spectrum covering at least a wavelength region of 1000 to 1300 nm.

In one embodiment, the stretching element may be an element structured to perform pulse stretching in a state where a slope of a change in time with respect to a wavelength is 10 picoseconds or more per 1 nm.

In one embodiment, the light receiver may be provided at a position where light transmitted through the product is received.

In one embodiment, the product inspection apparatus may further include an exclusion mechanism structured to exclude a product determined to be a defective product.

In one embodiment, the product inspection apparatus may further include an irradiation optical system structured to irradiate the tablet with the pulse-stretched pulsed light in a pattern having a size equal to or larger than a size of the tablet from one side.

In one embodiment, the manufactured product is irradiated with light without being subjected to a treatment such as dissolution in a solution, and quality determination is performed from the result. Therefore, it is possible to obtain a quality result in an extremely short time, and to perform total inspection.

In one embodiment, although the apparatus and the method determine the quality by the optical characteristic of the target product, since the pulse-stretched pulsed light is used, a time-consuming operation such as sweeping of the diffraction grating is unnecessary, and it is possible to determine the quality at high speed.

Furthermore, since not spatial spectroscopy using the diffraction grating but temporal spectroscopy using the time wavelength uniqueness of the pulse-stretched pulsed light is performed, a sufficient amount of light can be incident on the light receiver even in a short time. Therefore, it is possible to measure a high SN ratio at high speed, and it is possible to perform quality determination with high reliability at high speed.

In one embodiment, in the case of determining the quality based on a value at a predetermined time in one pulse of the output data from the light receiver by comparison with a reference value without calculating an optical characteristic, arithmetic processing is simplified, so that the quality determination can be performed at a higher speed.

In one embodiment, when the pulsed light source is structured to emit pulsed light that is light having a continuous spectrum covering at least a wavelength region of 1100 to 1200 nm, it is easier to determine the quality of the product.

In one embodiment, when the pulsed light source is structured to emit pulsed light that is light having a continuous spectrum covering at least a wavelength region of 1000 to 1300 nm, it is possible to easily determine the quality of more types of products.

In one embodiment, when the stretching element is an element that performs pulse stretching such that the slope of the change in time with respect to the wavelength is 10 picoseconds or more per 1 nm, sufficient wavelength resolution can be obtained, so that quality determination can be performed more accurately.

In one embodiment, when the light receiver is provided at a position where light transmitted through the product is received, the configuration is more suitable when the quality of the product is determined from the absorption spectrum.

In one embodiment, when the invention of the product inspection apparatus includes the exclusion mechanism, a product determined to be a defective product is excluded, so that it is possible to prevent an accident in which the defective product is erroneously shipped.

In one embodiment, in the case of the configuration in which the product is a tablet, and the product is irradiated with the pulse-stretched pulsed light in a larger pattern than that of the tablet from one side, the SN ratio in light measurement is high, so that it is possible to determine the quality of the tablet with higher accuracy in this respect.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 2(1)-2(2) are schematic diagrams showing pulse stretching by a stretching element, and FIG. 2(3) is a diagram schematically showing a relationship between an elapsed time and a wavelength in one pulse after the pulse stretching;

FIG. 5 is a schematic diagram showing spectrum calculation by a spectrum calculation module;

FIG. 7(1) and FIG. 7(2) are schematic diagrams of a main part of a product inspection apparatus of a third embodiment;

FIGS. 9(1) to 9(3) are schematic diagrams showing another example of the stretching element.

BEST MODE FOR CARRYING OUT THE INVENTION

Hereinafter, modes (embodiments) for carrying out the invention of this application will be described.

Figure 1:
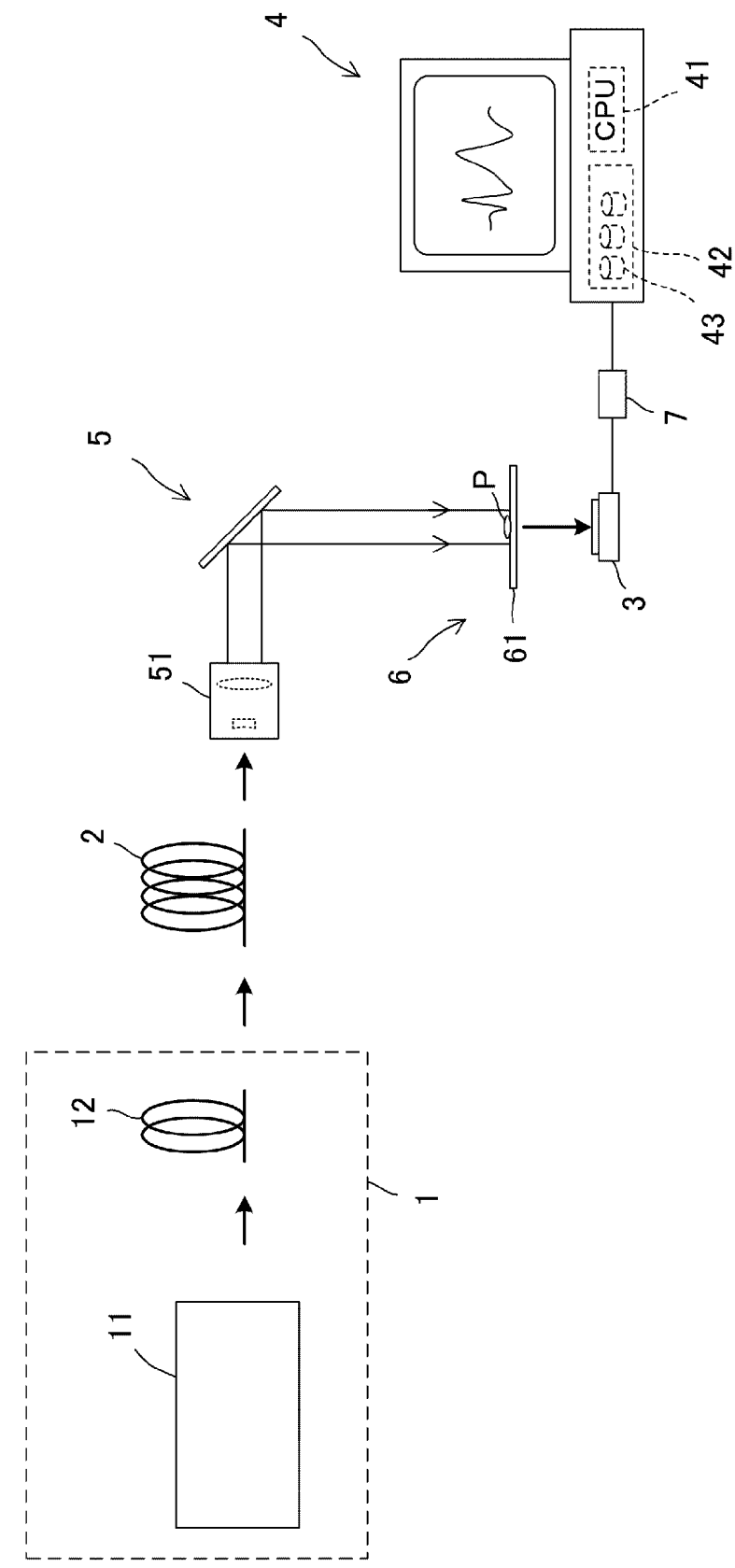
FIG. 1 is a schematic diagram of a product inspection apparatus of an embodiment.

FIG. 1 is a schematic diagram of a product inspection apparatus of the embodiment. The product inspection apparatus of the embodiment is used in a manufacturing line of various products, and determines quality of a product by performing light measurement on a product carried to an inspection place of the manufacturing line.

This apparatus determines quality of a product by light measurement, and has a feature in that super continuum light is used as light for the determination. Furthermore, this apparatus has a feature in that light is used in which a pulse width of super continuum light, which is pulsed light, is stretched, and at that time, a relationship between a wavelength and an elapsed time in one pulse is one to one. Spectroscopy using a conventional diffraction grating spatially disperses light, but in this embodiment, it can be said that light is temporally dispersed and used. Specifically, the product inspection apparatus according to the embodiment includes a pulsed light source 1, a stretching element 2, a light receiver 3, and a determination unit 4.

A phenomenon in which when ultrashort pulsed light such as ultrashort pulsed laser is passed through a nonlinear element such as a nonlinear fiber, a nonlinear effect such as self-phase modulation is generated to broaden the band is known as super continuum light (hereinafter, abbreviated as SC light). The pulsed light source 1 of the embodiment is a light source that emits the SC light. Thus, in this embodiment, the pulsed light source 1 includes an ultrashort pulse laser 11 and a nonlinear element 12.

As the ultrashort pulse laser 11, a gain-switched laser, a microchip laser, a fiber laser, or the like can be used. A fiber is often used as the nonlinear element 12. For example, a photonic crystal fiber or other nonlinear fibers can be used as the nonlinear element 12. The mode of the fiber is often a single mode, but even a multimode can be used as the nonlinear element 12 as long as it exhibits sufficient nonlinearity.

It is preferable that the pulsed light source 1 emits broadband light having a continuous spectrum over a near-infrared wavelength band of about 1100 to 1200 nm. In this embodiment, as will be described later, quality of a product is determined based on an absorption spectrum in the near-infrared range. From the viewpoint of increasing the range of products that can be inspected, it is more preferable that the pulsed light source 1 emits broadband light having a continuous spectrum over a wavelength region of 1000 to 1300 nm.

The stretching element 2 is structured to stretch the pulse width of the SC light emitted from the pulsed light source 1. The light emitted from the pulsed light source 1 spreads as a wavelength region, but remains as a short pulse on the order of femtoseconds to nanoseconds as a pulse width. Since it is difficult to use it for light measurement as it is, pulse stretching is performed by the stretching element 2. What is important at this time is that stretching is performed such that the one-to-one relationship between the wavelength and the elapsed time in one pulse is established.

Specifically, in this embodiment, as the stretching element 2, a wavelength dispersion fiber such as that used as a dispersion compensation fiber (DCF) in the field of optical communication is used. The wavelength dispersion fiber has a sufficient group delay characteristic, and is classified into a normal dispersion fiber and an anomalous dispersion fiber. Both can be used, but in this embodiment, a normal dispersion fiber is used as the stretching element 2.

FIG. 2 is a schematic diagram showing pulse stretching by the stretching element 2, and is a diagram schematically showing the relationship between the elapsed time and the wavelength in one pulse after the pulse stretching. FIG. 2(1) shows intensity with respect to the elapsed time in one pulse, and FIG. 2(2) shows intensity of each wavelength. FIG. 2(3) shows the relationship between the elapsed time and the wavelength in the pulse.

As shown in FIGS. 2(1) to (3), in the SC light after the pulse stretching, the elapsed time and the wavelength in one pulse correspond to each other on a one-to-one basis. That is, when the rise time of one pulse is $t_1$ and the end time of the pulse is $t_n$, light having the longest wavelength $\lambda_1$ exists at the beginning of the rise of one pulse. As the time elapses, the wavelength of the existing light shifts to a short wavelength side. Immediately before the end $t_n$ of the pulse, light having the shortest wavelength $\lambda_n$ exists. In this manner, the wavelength and the elapsed time in the pulse correspond to each other on a one-to-one basis. Therefore, when the elapsed time from the start $t_1$ of the pulse is specified and the intensity of light is acquired, the intensity is intensity of a specific wavelength. That is, the intensity at each elapsed time is intensity of each wavelength, and this is nothing but a spectral spectrum.

Such uniqueness of elapsed time and wavelength is particularly important in the configuration of the embodiment in which quality determination of a product is obtained by a spectroscopic spectrum by a temporal change of an output from the light receiver 3, but a ratio of a change in the wavelength with respect to the lapse of time is also important. This point is how much time shift (time dispersion) the difference of the wavelength of 1 nm exists, and is indicated by $\Delta t/\Delta \lambda$ in FIG. 2(3). In the embodiment, when $\Delta \lambda$ is 1 nm, $\Delta t$ is 10 picoseconds or more.

Each characteristic of the stretching element 2 can be realized by selecting a fiber having an appropriate dispersion characteristic. This point will be described below.

Figure 3:
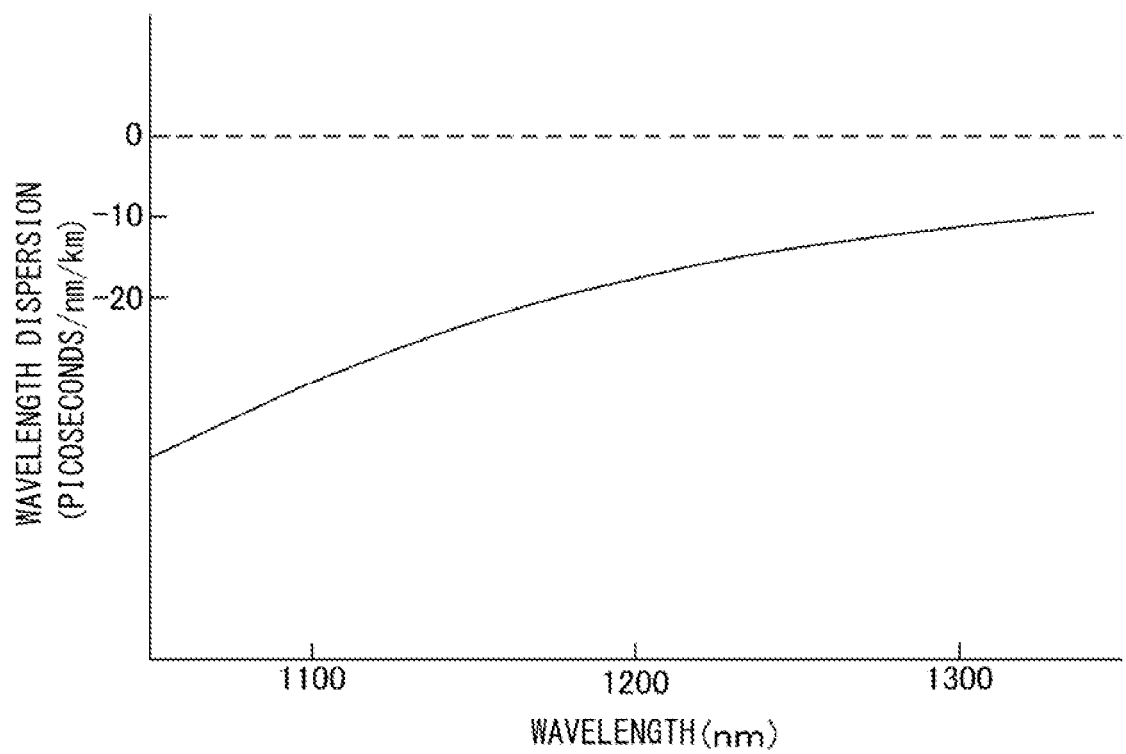
FIG. 3 is a schematic diagram showing an example of a dispersion characteristic of a fiber used as the stretching element.

FIG. 3 is a schematic diagram showing an example of a dispersion characteristic of a fiber used as the stretching element 2. It is desirable that the fiber as the stretching element 2 does not contain 0 dispersion in a wavelength region of at least 1100 to 1200 nm. That is, in the wavelength region of 1100 to 1200 nm, it is desirable that the dispersion characteristics are all normal dispersion characteristics or all anomalous dispersion characteristics. FIG. 3 is an example of a fiber having normal dispersion characteristic.

When 0 dispersion is included in the wavelength region of 1100 to 1200 nm, two or more wavelengths correspond to each other at the same time, and an unintended nonlinear optical effect is likely to occur, so that the above-described time wavelength uniqueness may be lost. In addition, a fiber showing normal dispersion at 1100 to 1200 nm is more desirable than anomalous dispersion. In many cases, the SC light has a characteristic that light on a long wavelength side is emitted first and light on a short wavelength side is emitted later. In this case, the pulse of the SC light has a long wavelength at an initial stage, and then shifts to the short wavelength side with the lapse of time. When a fiber having a normal dispersion characteristic is used as the stretching element 2, the light on the short wavelength side is further delayed as compared with the light on the long wavelength side, and thus the light is further stretched while maintaining the temporal relationship. Therefore, it is possible to easily obtain long-pulsed light without impairing the time wavelength uniqueness.

It is also possible to use a fiber of anomalous dispersion in the wavelength region of 1100 to 1200 nm as the stretching element 2. In this case, in the SC light, the light on the long wavelength side existing at the beginning of the pulse is delayed, and the light on the short wavelength side existing at the later time is dispersed in the traveling state. Therefore, the temporal relationship in one pulse is reversed, and pulse stretching is performed in the state where the light on the short wavelength side exists at the beginning of one pulse and the light on the longer wavelength side exists with the lapse of time. However, as compared with the case of normal dispersion, it is often necessary to further increase the propagation distance for pulse stretching, and the loss tends to be large. Therefore, normal dispersion is preferable in this respect.

As shown in FIG. 1, the product inspection apparatus of the embodiment includes an irradiation optical system 5 in order to irradiate a product P to be subjected to quality determination with pulsed-stretched SC light (hereinafter, referred to as stretched SC light). Further, a disposing tool 6 is provided to dispose the product P at an irradiation position of the stretched SC light by the irradiation optical system.

The irradiation optical system 5 is structured to radiate the stretched SC light from above, and a receiving plate 61 is used as the disposing tool 6. In this embodiment, the quality is determined by transmitted light, so that the receiving plate 61 is transparent in the measurement wavelength range.

The irradiation optical system 5 includes a beam expander 51 in consideration of a small beam diameter of the stretched pulsed SC light which is laser light. This is because the stretched pulsed light is radiated from one side of the product P, but for more accurate inspection, the stretched pulsed light should be radiated from the one side in a pattern having a size equal to or larger than that of the product P.

The light receiver 3 is provided at a position where transmitted light through the product P irradiated with the stretched SC light is received. As the light receiver 3, one having sufficient sensitivity in a measurement wavelength range is used. For example, one having high sensitivity and including a photoelectric conversion element such as an InGaAs photodiode is used as the light receiver 3.

The determination unit 4 is structured to process the output data from the light receiver 3 and to determine the quality of the product. As the determination unit 4, a general-purpose PC (Personal Computer) is used in this embodiment. The general-purpose PC includes a processor 41 and a storage (hard disk, memory, etc.) 42. In the storage 42, a quality determination program 43 that processes the output data from the light receiver 3 and outputs a quality determination result and other necessary programs are installed. An AD converter 7 is provided between the light receiver 3 and the determination unit 4, and the output data from the light receiver 3 is converted into digital data and input to the determination unit 4.

Figure 4:
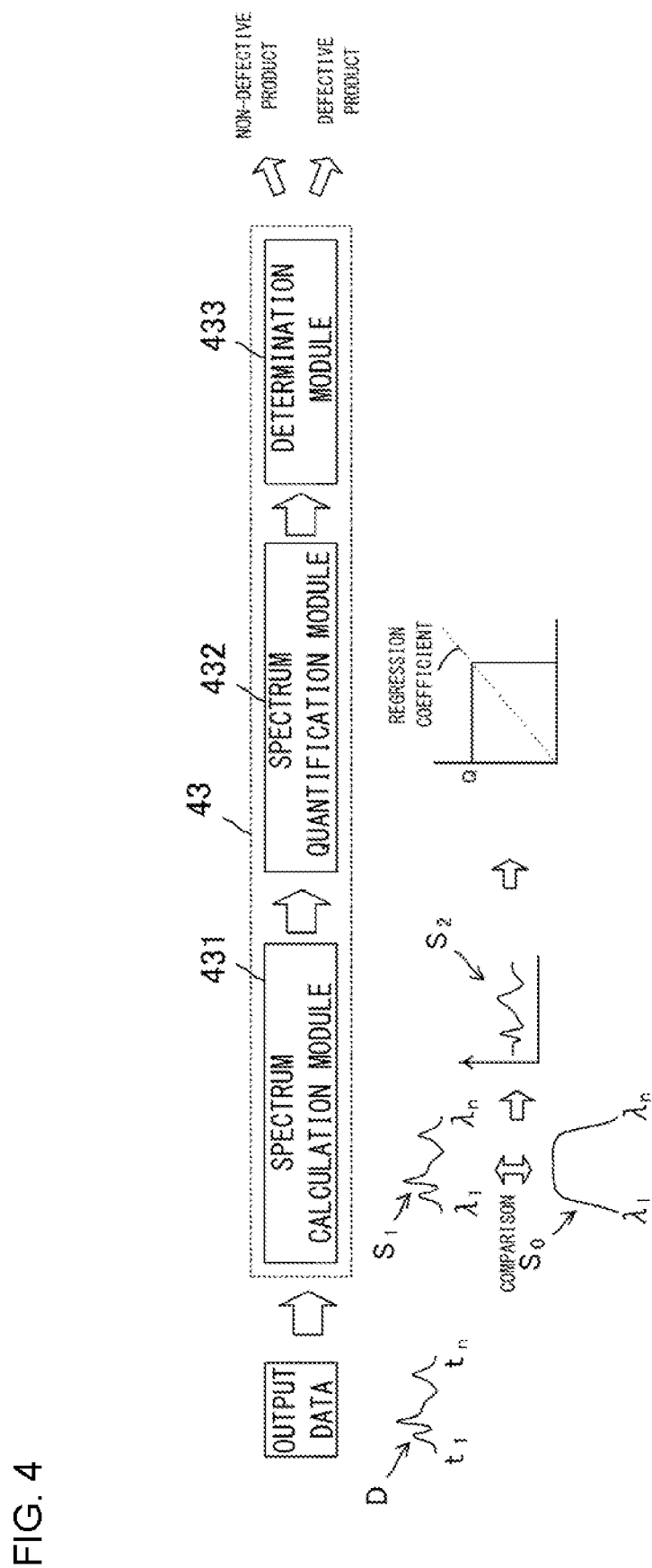
FIG. 4 is a diagram showing an outline of a quality determination program constituting a determination unit.

FIG. 4 is a diagram showing an outline of the quality determination program 43 constituting the determination unit 4. The final purpose of the quality determination program 43 is to determine the quality of the product based on the data (hereinafter, simply referred to as output data) output from the light receiver 3, and the method for this purpose is roughly classified into two types. One is a method of calculating a spectrum based on output data and comparing the spectrum with a reference value to determine quality. The other is a method of directly performing comparison with a reference value without calculating a spectrum from output data to determine quality. In this embodiment, the former method is used.

As shown in FIG. 4, the quality determination program 43 includes a spectrum calculation module 431, a spectrum quantification module 432, and a determination module 433. The spectrum calculation module 431 is a module that processes the output data to calculate an absorption spectrum $S_2$. The spectrum quantification module 432 is a module that obtains an amount (hereinafter, referred to as a quantitative value) Q that can be compared with the reference value based on the calculated absorption spectrum $S_2$. The determination module 433 is a module that compares the calculated quantitative value Q with the reference value, performs quality determination, and outputs the result as a program execution result.

First, the spectrum calculation module 431 will be described. FIG. 5 is a schematic diagram showing spectrum calculation by the spectrum calculation module 431.

As described above, in the stretched SC light, the wavelength and the elapsed time in the pulse correspond to each other on a one-to-one basis. Therefore, the spectrum calculation module 431 first converts a horizontal axis of output data D from time to wavelength. The output data D is a kind of data set, and is values $v_1$, $v_2$, $v_3$, ... at times $t_1$, $t_2$, $t_3$, ... every predetermined period $\Delta t$. The spectrum calculation module 431 recaptures the value at each time as the value at the corresponding wavelength $\lambda_1$, $\lambda_2$, $\lambda_3$, ..., and sets the value as a measurement spectrum $S_1$.

Next, the absorption spectrum $S_2$ is calculated by applying reference spectrum data $S_0$. That is, the reference spectrum data $S_0$ is acquired in advance by radiating the stretched pulsed light in a state where nothing is disposed on the receiving plate 61 and causing the stretched pulsed light to be incident on the light receiver 3, and is given to the spectrum calculation module 431 as a constant.

The reference spectrum data $S_0$ is also a kind of data set, and is a collection of intensities (reference intensities) $V_1$, $V_2$, $V_3$, ... at the times $t_1$, $t_2$, $t_3$, .... The spectrum calculation module 431 calculates $v_1/V_1$, $v_2/V_2$, $v_3/V_3$, ... for the wavelengths $\lambda_1$, $\lambda_2$, $\lambda_3$, ..., and takes logarithms of inverses as necessary to obtain the absorption spectrum $S_2$.

Although not shown, in a case where the light receiver 3 has a sensitivity characteristic with respect to a wavelength (in a case where the photoelectric conversion characteristic is not flat between wavelengths), correction according to the sensitivity characteristic is performed. A coefficient for correction is set in advance, and a value at each of the times $t_1$, $t_2$, $t_3$, ... is multiplied by the coefficient to obtain the measurement spectrum $S_1$ as the intensities $v_1$, $v_2$, $v_3$, ... at the wavelengths $\lambda_1$, $\lambda_2$, $\lambda_3$, ....

The calculated absorption spectrum $S_2$ is a sum of absorption spectra of respective components contained in the product. It is also possible to determine the quality of the product by the amount of all the contained components, but since it is too complicated, the quality is determined by the amount of a specific component. A specific component is a component that has the largest influence on quality of a product or a component the amount of which is the largest in the product. In the case of a pharmaceutical product, quality may be determined by the amount of an active ingredient.

In any case, in this embodiment, the quality is determined by the absorption spectrum $S_2$ in the near-infrared range. As is well known, in the near-infrared range, absorption bands of many materials overlap with each other, and it is difficult to directly obtain the amount of the target component from the calculation result of the absorption spectrum. For this reason, the spectrum quantification module 432 adopts a chemometrics method.

As chemometrics, techniques such as principal component analysis (PCA), principal component regression analysis (PCR), and partial least square regression (PLS regression) (PLSR) analysis are known. Although any method can be adopted, a case where PLSR is performed will be described as an example.

In the case of performing PLSR, measurement is similarly performed for a large number of samples (products) in which the amount of the target component is known, and data sets are obtained. Then, regression analysis is performed based on a large number of the obtained data sets to obtain a regression coefficient. In actual quantitative determination, the amount of the target component is predicted using the obtained regression coefficient, and the predicted value is set as a quantitative value.

PLSR is a technique developed from PCA and PCR, and first, principal component analysis is performed. That is, as represented by the following Formula 1, multivariate data X (here, an absorption spectrum measured for a sample whose target component amount is known) is decomposed into a principal component score T, a loading vector R, and a residual E.

[Mathematical Formula 1]

$$X = TR + E \quad (1)$$

In PLSR, principal component analysis is performed on the multivariate data X, and regression analysis is performed using the value of the principal component score T obtained in the principal component analysis in order to avoid collinearity. At this time, only a portion related to the amount of the principal component in the spectrum data set X is extracted, and the regression coefficient is obtained by the least squares method. Then, a calibration curve is created according to the regression coefficient thus obtained. Since PLSR and other chemometrics are explained in Non Patent Literature 1 and other documents, further explanation is omitted.

As shown in FIG. 4, the quality determination program 43 executes the determination module 433 after executing the spectrum quantification module 432. The determination module 433 is a module that compares the quantitative value Q obtained by the spectrum quantification module 432 with the reference value and determines quality. The reference value and the tolerance of the deviation from the reference value are given as constants to the determination module 433. The determination module 433 determines the quality according to these, and outputs the result as an execution result of the quality determination program 43.

The amount Q of the target component may be a ratio (content ratio) to the whole, or may be an absolute value (content). In the case of calculating the absolute value, a calibration curve is prepared so that the absolute value can be calculated, or in the case of the weight ratio, the weight of the product is separately measured and calculated.

In addition, in practice, the output data D is subjected to preprocessing such as smoothing or secondary differentiation, and thereafter, the quantitative value Q is acquired by applying the regression coefficient obtained by PLSR. At this time, wavenumber domain selection is performed to extract only a portion related to the target component, and the quantitative value is then acquired.

Next, the overall operation of the product inspection apparatus of the above embodiment will be described with reference to FIGS. 1 and 4. The following description is also a description of an embodiment of the invention of the product inspection method.

As described above, the product inspection apparatus is disposed at the inspection place of the manufacturing line of the product. The product P is conveyed to the inspection place. There is a case where the product P is carried by a conveyance mechanism such as a conveyor, or there is a case where the product P is carried by hand.

The product P is disposed on the receiving plate 61. Also in this case, there is a case where the product P is automatically disposed by a mechanism such as a robot, or there is a case where the product P is disposed by an operator.

The SC light emitted from the pulsed light source 1 is pulse-stretched with the time wavelength uniqueness by the stretching element 2 to become stretched SC light. The stretched SC light is radiated to the product P by the irradiation optical system 5. The stretched SC light transmitted through the product P reaches the light receiver 3 and is photoelectrically converted.

An output from the light receiver 3 is converted into a digital signal by the AD converter 7, and is input to the determination unit 4 as the output data D. In the determination unit 4, the quality determination program 43 is executed. The quality determination program 43 calculates the absorption spectrum $S_2$ from the output data D, quantifies the absorption spectrum $S_2$ by PLSR, and compares the value Q with the reference value to determine quality. The quality determination result is stored in the storage 42 in the determination unit 4.

According to the product inspection apparatus and the product inspection method of the embodiment as described above, the manufactured product is irradiated with light as it is without being subjected to a treatment such as dissolution in a solution, and quality determination is performed from the result. Therefore, it is possible to obtain a quality result in an extremely short time, and to perform total inspection.

In addition, although the apparatus and the method determine the quality by the spectral characteristic of the product, since the stretched SC light is used, it is unnecessary to perform a time-consuming operation such as changing the posture of the diffraction grating for wavelength sweep, and it is possible to determine the quality at high speed.

Then, since not spatial spectroscopy using the diffraction grating but temporal spectroscopy using the time wavelength uniqueness of the stretched SC light is performed, a sufficient amount of light can be incident on the light receiver 3 even in a short time. In the case of spatial spectroscopy using the diffraction grating, since there is a loss when the light is dispersed in a space, light incident on the light receiver tends to be weak, and it is necessary to cause light to be incident for a long time in order to measure a high SN ratio. In the apparatus and method of the embodiment, a sufficient amount of light can be incident on the light receiver 3 even in a short time, so that it is possible to measure a high SN ratio at high speed and to perform quality determination with high reliability at high speed.

In the above description, it has been described that the quality determination is performed by the stretched SC light of one pulse. However, in order to secure a necessary light amount, there is a case where the stretched pulsed light of a plurality of pulses is caused to be incident on the light receiver 3, and the quality determination is performed by the sum or average of the values at the times.

In the above embodiment, the point that the pulsed light source 1 emits super continuum light that is light having a continuous spectrum covering at least a wavelength region of 1100 to 1200 nm has a meaning of facilitating quality determination of a product. The near-infrared range of 1100 to 1200 nm often has an absorption spectrum corresponding to a component contained in a product, and analytical techniques such as chemometrics have also been developed. For this reason, the quality determination is also facilitated.

Even in the near-infrared range, the absorption spectrum is often slightly different depending on a product. In consideration of this, it is more preferable that the pulsed light source emits SC light having a continuous spectrum covering at least a wavelength region of 1000 to 1300 nm. This is because it is possible to easily determine the quality of various kinds of products having an absorption spectrum in the near-infrared range.

In addition, the point that the stretching element 2 performs pulse stretching such that the slope of the change in time with respect to the wavelength is 10 picoseconds or more per 1 nm has a meaning of enhancing the quality of quality determination from the viewpoint of wavelength resolution. As can be seen from the above description, when the slope of the change in time with respect to the wavelength becomes small, the wavelength resolution (resolution when the wavelength is temporally divided) becomes low in relation to the responsiveness of the light receiver. In this case, the quality determination is performed based on the values at the wavelengths that are considerably separated, and the accuracy of the quality determination is likely to decrease. If the slope of the change in time with respect to the wavelength is 10 picoseconds or more per 1 nm, such a problem does not occur.

In addition, the point that the light receiver 3 is provided at a position where the light transmitted through the product is received is more suitable for determining the quality of the product by the absorption spectrum. When the quality determination is performed using the absorption spectrum, it is also possible to calculate the absorption spectrum by capturing the reflected light from the product irradiated with light. However, in a case where the surface reflection is large, the measurement accuracy tends to be low, and the quality determination is often difficult. In addition, since the absorption spectrum mainly caused by the product surface is obtained, it is difficult to obtain information inside the product. In a case where the light receiver 3 is provided at the position where the light transmitted through the product is received, such a problem does not occur.

The point that the stretched SC light is radiated to the product in a pattern having a size equal to or larger than that of the product also has a meaning of increasing the SN ratio and increasing the accuracy of the quality determination. As the output data necessary for the quality determination, even data obtained by photoelectrically converting light emitted from a part of the region considered to be a product by the light receiver 3 reflects the property of the product, and the quality determination can be performed. However, since background light or the like is also incident on the light receiver 3 and becomes noise, the SN ratio should be increased by increasing the amount of light (signal light) from the product as much as possible, and the configuration of the embodiment satisfies this requirement.

Next, a product inspection apparatus and a product inspection method of a second embodiment will be described.

Figure 6:
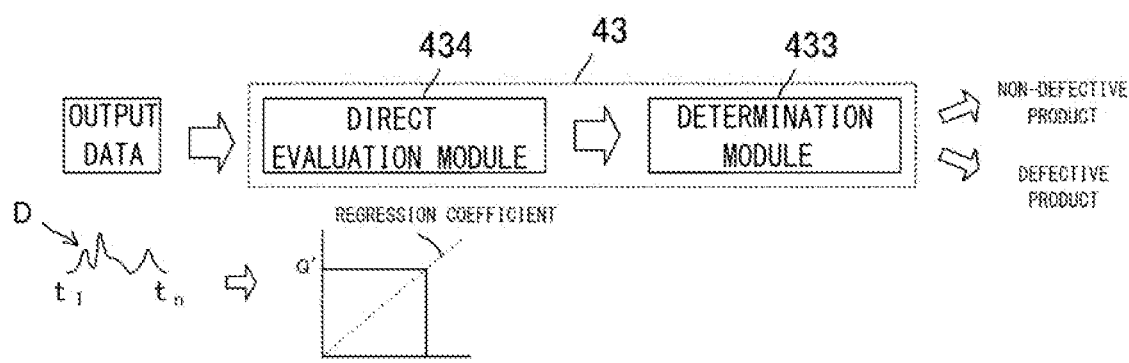
FIG. 6 is a schematic diagram of a main part of a product inspection apparatus of a second embodiment.

FIG. 6 is a schematic diagram of a main part of the product inspection apparatus of the second embodiment. In the second embodiment, the quality determination program 43 included in the determination unit 4 is different from that of the first embodiment. In the second embodiment, the apparatus and method perform the quality determination based on the output data from the light receiver 3, but perform the quality determination without calculating the optical characteristic as in the first embodiment. That is, the quality determination program 43 of the second embodiment includes a direct evaluation module 434 that acquires a value by evaluating output data from the light receiver 3 by chemometrics without calculating an optical characteristic, and the determination module 433 determines quality based on the acquired value in the direct evaluation module 434.

Specifically, also in the second embodiment, the output data D is input from the light receiver 3 to the determination unit 4 via the AD converter 7. Similarly, this is data sets including the values $v_1$, $v_2$, $v_3$, . . . at the times $t_1$, $t_2$, $t_3$, . . . .

Also in the second embodiment, a calibration curve is created in advance by chemometrics for this data set D, but at this time, the calibration curve is created without calculating an optical characteristic such as an absorption spectrum. That is, a large number of data sets D ($v_1$, $v_2$, $v_3$, . . . ) are obtained from the light receiver 3 by similarly irradiating a large number of products whose amounts of target components are known with stretched pulsed light. Then, regression processing such as PLSR is performed using the data sets D ($v_1$, $v_2$, $v_3$, . . . ) as they are, and a regression coefficient is calculated to obtain a calibration curve.

Therefore, as shown in FIG. 6, in the second embodiment, when the output data D ($v_1$, $v_2$, $v_3$, . . . ) is obtained by irradiating a certain target product with stretched SC light, a regression coefficient is applied thereto to calculate an amount Q' of a target component, and it is determined whether or not the amount Q' is within an allowable range with respect to a reference value. If it is within the allowable range, it is determined as a non-defective product, and if it is outside the allowable range, it is determined as a defective product.

In the second embodiment, since a step of calculating the optical characteristic and the program module are not provided, the quality determination program 43 is simplified, and the quality determination can be performed at a higher speed. Even when the light receiver 3 has the sensitivity characteristic with respect to the wavelength, the correction according to the sensitivity characteristic is unnecessary as long as the same light receiver 3 is used. The configuration is also simplified in this respect. However, in a case where there is a temporal change in the sensitivity of the light receiver 3, periodic calibration is required.

In the case of the first embodiment, it is possible to separately output the result at the stage where the spectrum calculation module 431 is executed. This result is the absorption spectrum of the target product, but the first embodiment is more preferable when the absorption spectrum needs to be known for evaluation of the product or for other purposes.

In the first embodiment, the quality determination program 43 calculates the absorption spectrum $S_2$ from the output data D and performs quantitative determination by PLSR. However, there may be a case where quality determination is performed without performing quantitative determination. That is, there may be a case where an absorption spectrum (reference absorption spectrum) in the case of a non-defective product is determined in advance, and after the spectrum calculation module 431 calculates the absorption spectrum $S_2$, the determination module 433 compares the absorption spectrum $S_2$ with the reference absorption spectrum to perform quality determination.

As still another embodiment, there may be a case where quality determination is performed only by an optical characteristic or a photoelectric conversion value for a specific wavelength. For example, it is assumed that a product contains a certain characteristic component, and the component has strong absorption at a certain wavelength. It is assumed that other components are not absorbed at the wavelength. In this case, in the output data, there may be a case where the quality determination is performed only by acquiring the data at the time corresponding to the wavelength and comparing the data or the optical characteristic calculated from the data with the reference value.

Next, a product inspection apparatus of a third embodiment will be described. FIG. 7 is a schematic diagram of a main part of the product inspection apparatus of the third embodiment.

The third product inspection apparatus includes an exclusion mechanism 8 that excludes a product determined to be a defective product by the determination unit 4 from the manufacturing line. The exclusion mechanism 8 can be appropriately configured according to the shape and size of a product, and an example thereof is shown in FIG. 7. FIG. 7(1) is a front schematic diagram, and FIG. 7(2) is a plan schematic diagram.

In this embodiment, as the product P, a small tablet-shaped product such as a tablet is assumed. In the first and second embodiments, the receiving plate 61 is used as the disposing tool, but in this embodiment, a rotary drum 62 is provided as the disposing tool.

The rotary drum 62 is a mechanism that rotates around a rotation axis 621 that is concentric with the rotary drum 62 and is horizontal. Although not shown, a belt and a motor are connected to the horizontal central axis so as to rotate at a predetermined rotation speed.

The rotary drum 62 has a structure for holding a plurality of products P on the peripheral surface. On the peripheral surface of the rotary drum 62, suction holes (not shown) are provided at equal intervals. Each suction hole communicates with a vacuum pump (not shown), and the exclusion mechanism 8 includes a vacuum suction system 81 that independently turns on and off suction of each suction hole. As shown in FIG. 7, each product P is conveyed by a conveyor or the like, comes into contact with the peripheral surface of the rotary drum 62, and is sucked and held by the suction hole. As the vacuum suction system 81, a mechanism that independently turns on and off communication between each suction hole and the vacuum pump may be adopted. For example, a mechanism in which an opening/closing plate is provided for each suction hole and each opening/closing plate is independently driven may be adopted.

Each product P is sucked such that the thickness direction of the product P is oriented horizontally. As a configuration for this purpose, for example, grooves are provided on the conveyor, and the width of each of the grooves is set to about the thickness of the product. Each product is dropped into the groove and conveyed. At this time, the product takes a vertically standing posture (a posture in which the radial direction is in a vertical plane), and is sucked to and held by the rotary drum 62 in this posture.

Meanwhile, a light irradiator and a light receiver are provided in a predetermined positional relationship with respect to the rotary drum 62. Although the light irradiator is a part of the irradiation optical system 5, in this embodiment, the light irradiator is an irradiation side optical fiber 52 that guides and emits light from the light source 1. The light receiver is a light-receiving-side optical fiber 31 on which transmitted light through the product P is incident. The light receiver is disposed at a position where light from the emission side of the light-receiving-side optical fiber 31 is received.

The exclusion mechanism 8 includes a controller (not shown) that controls the vacuum suction system 81, and the output of the determination unit 4 is input to the controller. Further, with respect to the rotary drum 62, a position at which a product is released in a case of a non-defective product and a position at which a product is released in a case of a defective product are set as different positions. A conveyor or the like for conveying the non-defective product to a next process is disposed at a position at which the non-defective product is released, and an input port for disposal is disposed at the position at which the defective product is released.

When an output indicating that the product is a defective product is issued from the determination unit 4, the controller turns off the vacuum suction of the suction hole sucking the product at the position at which the defective product is released, and turns off the vacuum suction at the position at which the non-defective product is released in other cases.

According to the third embodiment, since the exclusion mechanism 8 is provided, a product determined to be a defective product can be reliably and automatically excluded from the manufacturing line. Therefore, an accident in which a defective product is erroneously shipped is prevented.

In addition to the above, various configurations may be adopted as the configuration of the exclusion mechanism 8. For example, it is possible to adopt a configuration in which a conveyor that conveys a product includes opening/closing units such as shutters, the product is disposed on each opening/closing unit and conveyed, and a product determined to be a defective product is dropped by opening the opening/closing unit, a configuration in which a product is removed from a manufacturing line by being picked up by a robot arm or discharged by air blow, or the like.

Further, in each of the above embodiments, there may be a case where quality of a product moving for conveyance or the like is determined without stopping the movement of the product. There may be a case where a certain region is irradiated with stretched SC light, the product is moved so as to pass through the region, and quality determination is performed at that time. If the product is irradiated with a plurality of pulses while passing through the irradiation region, the quality determination is performed by taking the average in the processing of the output data of the light receiver 3. The fact that the quality determination can be performed without stopping the movement leads to that the quality determination can be performed without decreasing throughput, and the significance is particularly remarkable when total inspection is performed.

Although the invention of the present application enables the total inspection, it is not necessarily essential to perform the total inspection. The configuration of the invention of the present application capable of performing inspection with high speed and high reliability even when only sampling inspection is performed greatly contributes to manufacture of a high-quality product with high productivity.

Figure 8:
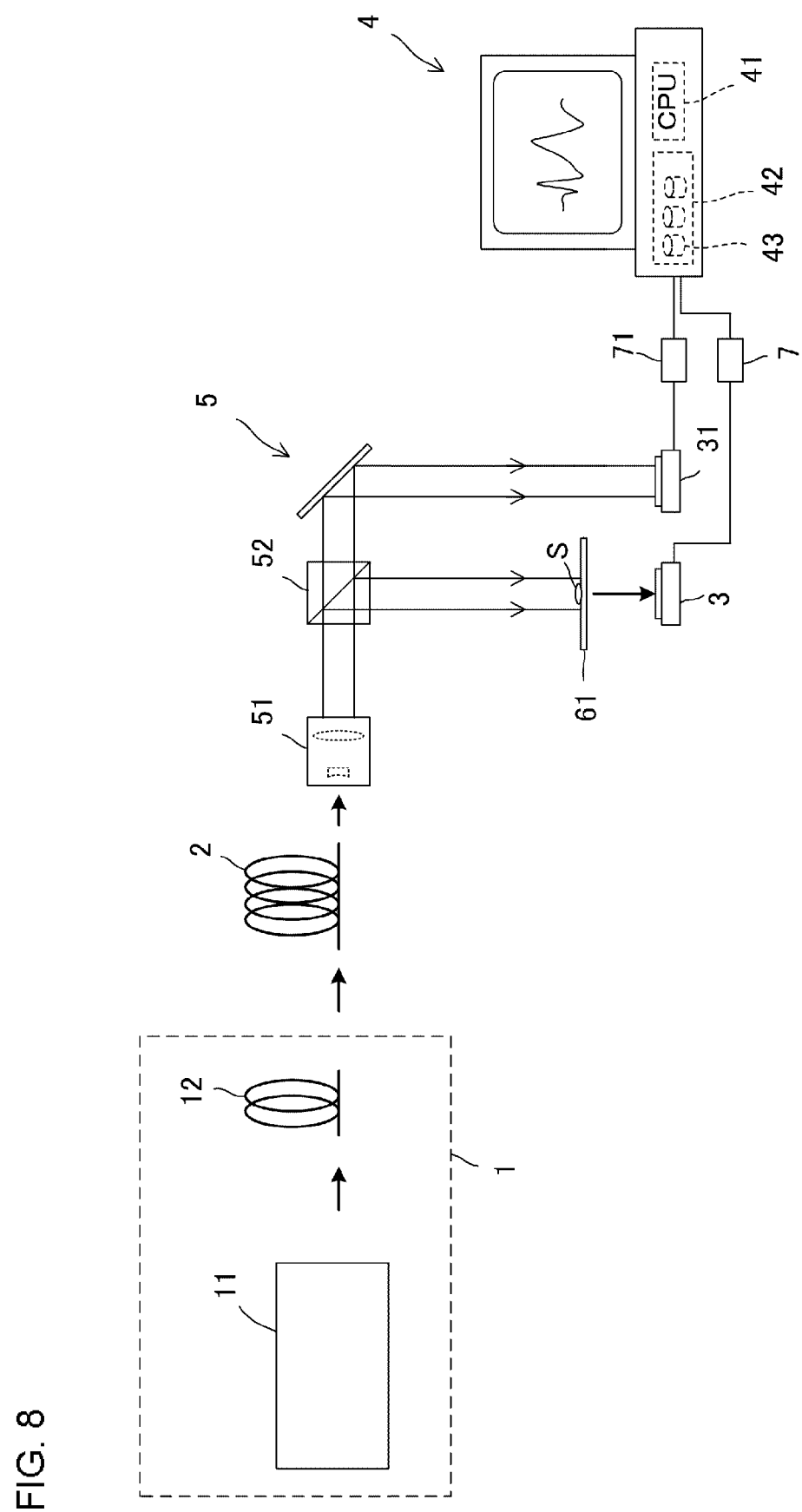
FIG. 8 is a schematic diagram of a product inspection apparatus of a fourth embodiment.

Next, a product inspection apparatus of a fourth embodiment will be described. FIG. 8 is a schematic diagram of the product inspection apparatus of the fourth embodiment.

As shown in FIG. 8, a spectroscopic measurement apparatus of the fourth embodiment is provided with a splitting element 52 that splits the pulsed light stretched by the pulse stretching element 2. As the splitting element 52, a beam splitter is used in this embodiment.

The splitting element 52 divides an optical path from the pulsed light source 1 into a measurement optical path and a reference optical path. In the measurement optical path, as in the first embodiment, the receiving plate 61 is disposed, and the measurement light receiver 3 is disposed at a position on the receiving plate 61 where the light transmitted through an object S is received.

A reference light receiver 31 is disposed on the reference optical path. Light that is branched by the splitting element 52 and travels through the reference optical path is incident on the reference light receiver 31 as it is. The light (reference light) is incident on the reference light receiver 31 without passing through the object S to obtain reference spectrum data in real time.

The measurement light receiver 3 and the reference light receiver 31 are connected to a calculator 4 via the AD converters 7 and 71, respectively. The quality determination program 43 in the calculator 4 is programmed to perform real-time reference intensity spectrum reference. That is, the measurement values $v_1, v_2, v_3, \ldots$ at the times $t_1, t_2, t_3, \ldots$ are input from the measurement light receiver 3, and the reference intensities $V_1, V_2, V_3, \ldots$ (reference spectrum data) at the times $t_1, t_2, t_3, \ldots$, which are the same times, are input from the reference light receiver 31. The quality determination program 43 calculates $v_1/V_1, v_2/V_2, v_3/V_3, \ldots$ according to the relationships between the times $t_1, t_2, t_3, \ldots$ and the wavelengths $\lambda_1, \lambda_2, \lambda_3, \ldots$ in one pulse examined in advance, and takes logarithms of inverses as necessary to obtain an absorption spectrum. The reflection spectrum and the scattering spectrum can be measured similarly by reference spectrum data acquired in real time.

In this embodiment, since the reference spectrum data is acquired in real time, the reference spectrum data is not periodically acquired. This embodiment is the same as the first embodiment except for this point.

According to the fourth embodiment, it is unnecessary to separately acquire the reference spectrum data, so that the efficiency of the entire quality determination work is increased. In addition, in the first embodiment, in a case where the characteristic of the pulsed light source 1 and the characteristic of the stretching element 2 are likely to change, it is necessary to frequently perform the calibration work, but it is unnecessary in the fourth embodiment. Even if the characteristic of the pulsed light source 1 and the characteristic of the stretching element 2 do not change, in a case where the measurement environment is different (for example, in a case where the temperature condition, the condition of background light, and the like are different), the calibration work may be required. In the fourth embodiment, since the calibration work is unnecessary even in such a case, inspection efficiency is high. However, in the fourth embodiment, since the light flux from the pulsed light source 1 is divided into two, the light flux that can radiate the object S is reduced by that amount. Therefore, in a case where it is necessary to perform inspection by irradiating the object S with higher intensity, the first embodiment is more advantageous.

Figure 10:
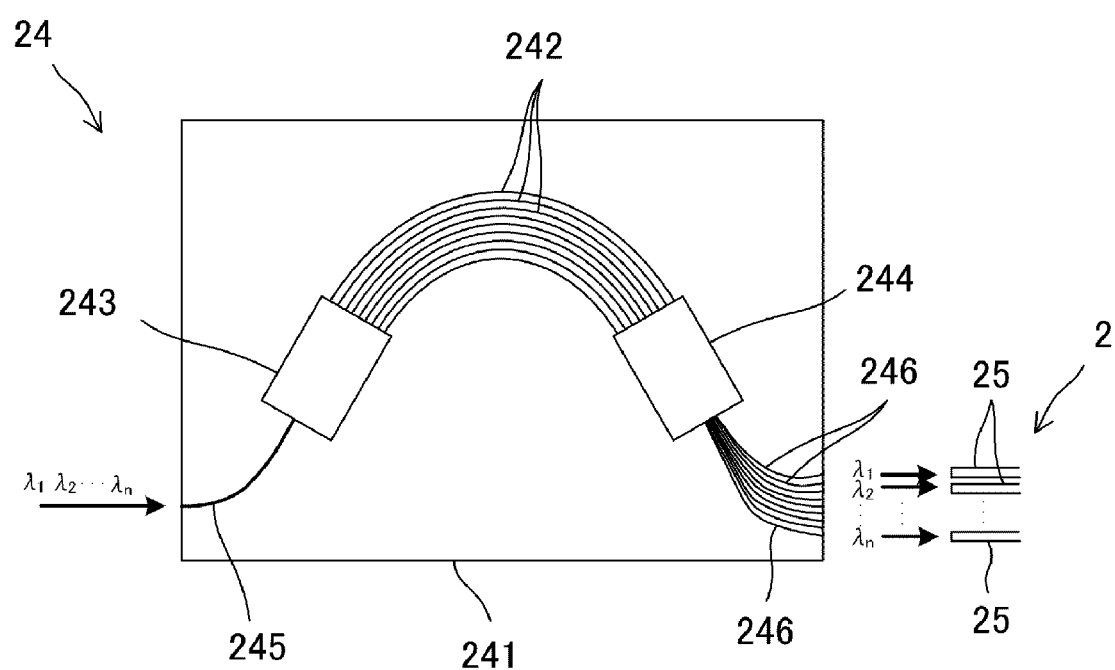
FIG. 10 is a schematic diagram showing another example of the stretching element.

Next, other examples of the stretching element 2 will be described with reference to FIGS. 9 and 10. FIGS. 9 and 10 are schematic diagrams showing other examples of the stretching element 2. The stretching element 2 can be configured using a diffraction grating, a chirped fiber Bragg grating (CFBG), a prism, or the like, in addition to the fiber. For example, as shown in FIG. 9(1), two diffraction gratings 21 can be used to perform wavelength dispersion. When the light is folded back by a mirror, the light is wavelength-dispersed by the two diffraction gratings 21 in the forward path and the backward path (four times in total). As a result, an optical path difference is given according to the wavelength, and pulse stretching is performed in a state where time wavelength uniqueness is achieved. In this example, the longer the wavelength of light, the shorter the optical path.

As shown in FIG. 9(2), it is also possible to perform pulse stretching using a CFBG 22. The FBG is a fiber in which a diffraction grating is configured by periodically providing a portion in which a refractive index changes in a length direction of a core, and specifically, the CFBG 22 can be said to be a fiber in which a reflection position is set to a different position according to a wavelength so that a function of a chirp mirror is realized using the fiber. In the case of use as the pulse stretching element 2, in the CFBG 22, a refractive index variation layer in the core is formed such that, for example, light on a long wavelength side among the incident light beams is reflected and returned on the front side in the traveling direction in the fiber, and is reflected and returned on the back side as the light is on the short wavelength side. In this case, similarly to the normal dispersion fiber, since the light returns with a delay on the shorter wavelength side, the time wavelength uniqueness is secured.

Further, as shown in FIG. 9(3), prisms 23 may also be used for pulse stretching. In this example, four prisms (two pairs of prisms) 23 are used and disposed such that the optical path becomes shorter toward the longer wavelength side and the optical path becomes longer toward the shorter wavelength side, thereby constituting the stretching element 2. Also in this example, since the light reaches the light receiver 3 with a delay on the shorter wavelength side, the time wavelength uniqueness is secured.

In the examples of FIGS. 9(1) to (3), an optical path difference is formed when light is folded back. As a configuration for extracting light in the backward path, a configuration in which a combination of a polarizing beam splitter and a ¼ wavelength plate is disposed on an optical path in front of the stretching element 2 can be adopted. In the forward path, the light advances in the order of the polarization beam splitter and the ¼ wavelength plate and is incident on the pulse stretching element 2, and in the backward path, the light returned from the pulse stretching element 2 advances in the order of the ¼ wavelength plate and the polarization beam splitter.

FIG. 10 shows an example in which a plurality of fibers 25 are used as the stretching element 2. In this example, pulsed light is divided into light beams having respective wavelengths by an arrayed waveguide grating (AWG) 24, and the light beams having the respective wavelengths are pulse-stretched by the respective fibers 25.

The arrayed waveguide grating 24 is configured by forming functional waveguides 242 to 246 on a substrate 241. The functional waveguides include a large number of arrayed waveguides 242 having optical path lengths slightly different from each other, slab waveguides 243 and 244 connected to both ends (incident side and emission side) of the arrayed waveguides 242, an incident-side waveguide 245 that causes light to be incident on the incident-side slab waveguide 243, and emission-side waveguides 246 that extract light having each wavelength from the emission-side slab waveguide 244.

The slab waveguides 243 and 244 are free spaces, and light incident through the incident-side waveguide 245 spreads in the incident-side slab waveguide 243 and is incident on each arrayed waveguide 242. Since the lengths of the arrayed waveguides 242 are slightly different from each other, the phases of the light beams reaching the ends of the arrayed waveguides 242 are shifted by the difference. The light is diffracted and emitted from each arrayed waveguide 242, but the diffracted light beams pass through the emission-side slab waveguide 244 while interfering with each other and reach the incident ends of the emission-side waveguides 246. At this time, the interference light has the highest intensity at a position corresponding to the wavelength due to the phase shift. That is, the light beams having different wavelengths are sequentially incident on the emission-side waveguides 246, and the light is spatially dispersed. Strictly speaking, each of the emission-side waveguides 246 is formed such that each incident end is located at such a position that the light is dispersed in such a manner. Each of the fibers 25 as the stretching element 2 is connected to each of the emission-side waveguides 246.

Each of the fibers 25 may be the same, or fibers having different characteristics may be used. Since the light beams having different wavelengths are sequentially incident on the fibers 25, it is preferable to make the lengths of the fibers 25 different according to the wavelengths. The delay of the light beam of each wavelength is adjusted by adjusting the length of the fiber 25 so that appropriate time wavelength uniqueness can be obtained.

The plurality of fibers 25 may be a bundle fiber. In addition, it is also possible to perform pulse stretching by using a multicore fiber so that light having each wavelength is transmitted by each core.

In the above description, a tablet is exemplified as a product, but the invention of the present application can be applied to any product as long as the product is a product in which the contained component gives quality. Examples of the oral product having a shape such as a tablet or a granule include various foods such as a health food and a supplement in addition to a pharmaceutical product, and the invention of the present application can also be applied to various industrial products in which the amount of the contained component after completion may be a problem. For example, it is conceivable to determine quality of a fine component or an electronic component manufactured by a semiconductor process according to the invention of the present application during manufacturing or after completion.

The above example is an example of a product that is a solid phase, but the invention of the present application can also be applied to a product that is a liquid phase. For example, it can be used for inspection of pharmaceutical products in a liquid phase such as liquid medicine. Specifically, there is an example in which the manufactured pharmaceutical product in a liquid phase is irradiated with pulsed light through a transparent container to inspect quality. In addition, reagents for various researches, synthesis, and the like may be products, and the invention of the present application can also be applied to liquid-phase reagents.

In addition, as the pulsed light source 1, in addition to one that emits SC light, an amplified spontaneous emission (ASE) light source, a superluminescent diode (SLD) light source, or the like may be adopted. Since the ASE light source is light generated in the fiber, when the fiber is used as the pulse stretching element 2, it is possible to cause broadband pulsed light to be incident on the stretching element 2 with high affinity and low loss, and to stretch the broadband pulsed light with high efficiency. In addition, since also the SLD light source extracts light emission in a narrow active layer, it is possible to cause broadband pulsed light to be incident on the stretching element 2 with low loss, and to stretch the broadband pulsed light with high efficiency.

The invention claimed is:

1. A product inspection method for determining quality of a product by performing light measurement, the method comprising:
    an emission step of causing broadband pulsed light to be emitted from a light source;
    a stretching step of stretching a pulse width of the emitted pulsed light by a stretching element such that a wavelength and an elapsed time have a one-to-one relationship in one pulse;
    an irradiation step of irradiating a product with the stretched pulsed light;
    a light receiving step of receiving, by a light receiver, light from the product irradiated with the stretched pulsed light; and
    a determination step of determining quality of the product by processing output data from the light receiver.

2. The product inspection method according to claim 1, wherein the determination step includes:
    determining the quality of the product by calculating a content ratio or a content of a specific component of the product according to the output data; and
    comparing the calculated content ratio or content with a reference value.

3. The product inspection method according to claim 1, wherein the determination step includes:
    determining the quality based on a value at a predetermined time in one pulse of the output data from the light receiver by comparison with a reference value without calculating an optical characteristic.

4. The product inspection method according to claim 1, wherein the determination step includes:
   determining the quality without performing quantitative determination by comparing an optical characteristic of a predetermined wavelength calculated based on a value at a predetermined time in one pulse of the output data from the light receiver or a value at the predetermined time with a reference value.

5. The product inspection method according to claim 1, wherein the broadband pulsed light emitted in the emission step is light having a continuous spectrum covering at least a wavelength region of 1100 to 1200 nm.

6. The product inspection method according to claims 1, wherein the broadband pulsed light emitted in the emission step is light having a continuous spectrum covering at least a wavelength region of 1000 to 1300 nm.

7. The product inspection method according to claims 1, wherein the pulsed light pulse-stretched in the stretching step has a slope of a change in time with respect to a wavelength of 10 picoseconds or more per 1 nm.

8. The product inspection method according to claims 1, wherein the light receiving step includes receiving light transmitted through the product.

9. The product inspection method according to claims 1, wherein the irradiation step includes radiating the pulsed light in a pattern having a size equal to or larger than a size of the product from one side.

10. A product inspection apparatus structured to determine quality of a product by performing light measurement, the product inspection apparatus comprising:
   a pulsed light source structured to emit broadband pulsed light;
   a stretching element structured to stretch a pulse width of the pulsed light emitted from the pulsed light source such that a wavelength and an elapsed time in one pulse have a one-to- one relationship in one pulse;
   a light receiver provided at a position where light from a product irradiated with the stretched pulsed light is received; and
   a determination unit structured to determine quality of the product by processing output data from the light receiver.

11. The product inspection apparatus according to claim 10, wherein the determination unit is structured to determine the quality of the product by calculating a content ratio or a content of a specific component of the product according to the output data from the light receiver and compare the calculated content ratio or content with a reference value.

12. The product inspection apparatus according to claim 10, wherein the determination unit is structured to determine the quality based on a value at a predetermined time in one pulse of the output data from the light receiver by comparison with a reference value without calculating an optical characteristic.

13. The product inspection apparatus according to claim 10, wherein the determination unit is structured to determine the quality without performing quantitative determination by comparing an optical characteristic of a predetermined wavelength calculated based on a value at a predetermined time in one pulse of the output data from the light receiver or a value at the predetermined time with a reference value.

14. The product inspection apparatus according to claims 10, wherein the pulsed light source is structured to emit pulsed light that is light having a continuous spectrum covering at least a wavelength region of 1100 to 1200 nm.

15. The product inspection apparatus according to claims 10, wherein the pulsed light source is structured to emit pulsed light that is light having a continuous spectrum covering at least a wavelength region of 1000 to 1300 nm.

16. The product inspection apparatus according to any one of claims 10, wherein the stretching element is an element structured to perform pulse stretching in a state where a slope of a change in time with respect to a wavelength is 10 picoseconds or more per 1 nm.

17. The product inspection apparatus according to claims 10, wherein the light receiver is provided at a position where light transmitted through the product is received.

18. The product inspection apparatus according to claims 10, further comprising an exclusion mechanism structured to exclude a product determined to be a defective product.

19. The product inspection apparatus according to claims 10, wherein the product is a tablet, and the product inspection apparatus further comprises an irradiation optical system structured to irradiate the tablet with the pulsed light pulse-stretched in a pattern having a size equal to or larger than a size of the tablet from one side.

* * * * *